United States Patent [19]
Cohen

[11] Patent Number: 5,235,414
[45] Date of Patent: Aug. 10, 1993

[54] NON-OBTRUSIVE PROGRAMMING MONITOR

[75] Inventor: Gerald B. Cohen, Gaithersburg, Md.

[73] Assignee: Control Data Corporation, Minneapolis, Minn.

[21] Appl. No.: 526,103

[22] Filed: May 21, 1990

[51] Int. Cl.$^5$ .......................................... H04N 17/00
[52] U.S. Cl. .............................. 358/84; 455/2; 455/151.4
[58] Field of Search .............. 358/84, 181; 455/2, 455/151, 151.4, 151.1, 151.2; 340/825.22, 825.56

[56] References Cited
U.S. PATENT DOCUMENTS

| | | | |
|---|---|---|---|
| 4,225,970 | 9/1980 | Jaramicco et al. | 455/89 |
| 4,622,583 | 11/1986 | Watanabe et al. | 455/2 |
| 4,876,736 | 10/1989 | Kiewit | 455/2 |
| 4,885,632 | 12/1989 | Mabey et al. | 358/84 |
| 4,907,079 | 3/1990 | Turner et al. | 358/181 |
| 4,912,552 | 3/1990 | Allison et al. | 358/84 |
| 4,943,963 | 7/1990 | Waechter et al. | 455/2 |
| 4,972,503 | 11/1990 | Zurlinden | 455/2 |

Primary Examiner—Reinhard J. Eisenzopf
Assistant Examiner—Edward Urban

[57] ABSTRACT

A meter for unobtrusively monitoring the tuning of a home entertainment center. The device is able to work with remote controls of components of the center. The present invention receives signals from the remote control(s), decides to which component the signal was intended, sends an infrared signal to the proper component, and stores tuning information regarding the center. The stored information may be retrieved at a later time and used to make programming decisions. The present invention includes infrared sensors which receive the signals from the remote(s), a microprocessor, and a transmission device to transmit the signal to the intended device. Alternately, the control signal may be generated by a touch panel array placed over digital keypads of the center's components. When a key is pushed, the control signal is generated. The touch panel array(s) can serve solely or in combination with the remote control(s) to generate control signals.

40 Claims, 3 Drawing Sheets

NON-OBTRUSIVE PROGRAMMING MONITOR

BACKGROUND OF THE INVENTION

1. Field of the Invention

This invention relates to the monitoring of home entertainment centers having components with either digital controls thereon or digital remote controls. More particularly, the present invention can monitor the programming being enjoyed by an audience through an audio/video receiver (such as a television or audio receiver), even though the programming may be coming from any of a number of sources such as over the air, from a cable or from a video cassette recorder (VCR).

2. Description of the Prior Art

In the entertainment industry, ratings are all important for determining advertising rates and for adjusting programming. The viewing habits of an audience must be monitored to generate the ratings without altering or disturbing such habits. Any monitoring equipment must present the same or equivalent ergonomics that the viewer had previously enjoyed. Information obtained from such monitoring is used by networks and other programming sources in making programming decisions, especially since the entertainment industry is locked in fierce competition for larger shares of the viewing market.

Television monitoring systems have recently been developed and are described in the patent literature. U.S. Pat. No. 4,769,697 to Gilley et al. teaches a passive television audience measuring system. This system accepts viewer responses concerning the programming being watched, and can therefore collect viewer as well as programming information. However, this information must be supplied by the viewer. No suggestion is made concerning how to monitor complete home entertainment centers that include cable and VCRs, particularly without viewer input.

U.S. Pat. No. 4,613,904 to Lurie also discloses a television monitoring device. This device monitors a rolling bar code that is displayed when initiating viewing or switching channels. This device does not monitor a plurality of components nor is it unobtrusive as it requires a photocell to cover a section of the television screen so that the rolling bar code can be detected. There is no suggestion that this device may be used with a plurality of components.

Another patent to Lurie, U.S. Pat. No. 4,626,904, discloses a device for passively logging the presence and identity of viewers of a television, and stores channel information. This device requires that all the viewers wear headphones and is therefore not "ergonomic".

A final patent to Lurie, U.S. Pat. No. 4,779,198, deals with an audience monitoring system. This device is particularly oriented towards monitoring people entering and leaving a room. Each entrance to a room is fitted with a motion detector. In response to the detector the monitor records when people come and go and further records channel selection from the television. There is no mention of monitoring a complete home entertainment center.

Systems for detecting and monitoring the channel to which television receiver systems are tuned are known in the art. However such systems are not useful with entertainment systems having plural components with digital controls or digital remote controls. Previous monitoring systems are disclosed in U.S. Pat. Nos. 4,605,958 and 4,816,904 to Machnik et al and McKenna et al. respectively.

Machnik et al. monitor the channel selected by a cable converter of a television system and stores information pertinent thereto. The cable is attached to the device which monitors the signal. The output of the device is applied to the cable converter.

McKenna et al. disclose remote units that are controlled from a central location, each unit being attached to a television receiver. The device can store information relating to television mode as well as viewer identification.

Previous patents have disclosed a "smart" or reconfigurable remote control transmitter which may be used with a plurality of remotely controlled products, each of which is normally controlled by signals from an associated remote control. Such a device is taught by Evans et al. in U.S. Pat. No. 4,825,200. A similar device, which is capable of learning, storing and repeating the control codes from any other infrared transmitter, is disclosed in both U.S. Pat. No. 4,626,848 to Ehlers and U.S. Pat. No. 4,623,887 to Welles, II. Seymour et al. in U.S. Pat. No. 4,709,412 teach a device which can hold a plurality of infrared remote controls.

While all of the devices above have the ability to learn the functions of other remote controls, none teach or suggest recording the information about channel selection or about which device is in use at certain times for later retrieval and analysis.

Dockery, U.S. Pat. No. 4,809,359, teaches a system for extending the effective operational range of infrared remote control system using a radio signal. A remote control transmitter incorporated into a television receiver is disclosed by Rumbolt et al. in U.S. Patent 4,841,368. Uehira, in U.S. Pat. No. 4,755,883, discloses a removable information inputting device. Uehira is intended to put information into an electronic device so that a specific function, such as taping a movie on a specific day and time, may be carried out. U.S. Pat. No. 3,641,299 to Mayer discloses a switch having a transparent area that is suitable for placement over a video display.

Hence, the prior art is deficient in not being able to unobtrusively monitor the viewing habits of an audience with regard to a home entertainment center where multiple components can receive signals from multiple sources. None of the known prior art can transfer information from one or more remote controls or on-device digital inputs to the appropriate piece of equipment in a home entertainment center and at the same time store data relating to what piece of equipment was in use at what time and what channel of a television was being viewed.

SUMMARY OF THE INVENTION

The present invention provides a device that can receive a digital command, transfer it to the appropriate member of an entertainment system, store information reflecting what piece of equipment was in use and what channel was the active channel of the television and later transmit such information to a central computer.

The present invention accurately monitors and meters the audio/video (A/V) tuning and channel selection of a digitally controlled home entertainment center in an unobtrusive manner so that control signals are not interfered with and there is no requirement for any electrical connections to the tuning systems of the components of the entertainment system. The present invention is not utilized in lieu of the A/V receivers of the system, rather it cooperates with them. Further, the present invention cooperates with any remote control devices associated with the entertainment system components.

The present invention collects data concerning usage of a programming monitor component of a home entertainment center by monitoring at least one component of the center that is controlled by control signals. The invention includes sensor means that detect the control signals, means that transfer the signal to the component for which it was intended, data generating means which create data based on the control signals regarding use of the programming monitor component, and outputting means for outputting the data.

Therefore, the present invention, without using probes or any obtrusive apparatus or methods, presents an effective method for monitoring the tuning of entertainment systems. The invention is especially effective as today's A/V equipment has a greater usage of computerized circuitry, modern keypads, infrared remote controls and multimedia configurations including TV/VCR, picture-in-a-picture and other special effects.

BRIEF DESCRIPTION OF THE DRAWINGS

Other objects, features and characteristics of the present invention, as well as the methods of operation and functions of the related elements will become apparent upon consideration of the following description and the appended claims with reference to the accompanying drawings, all of which form a part of this specification, wherein like reference numerals designate corresponding parts in the various figures.

DETAILED DESCRIPTION OF THE PRESENTLY PREFERRED EXEMPLARY EMBODIMENT

Figure 1:
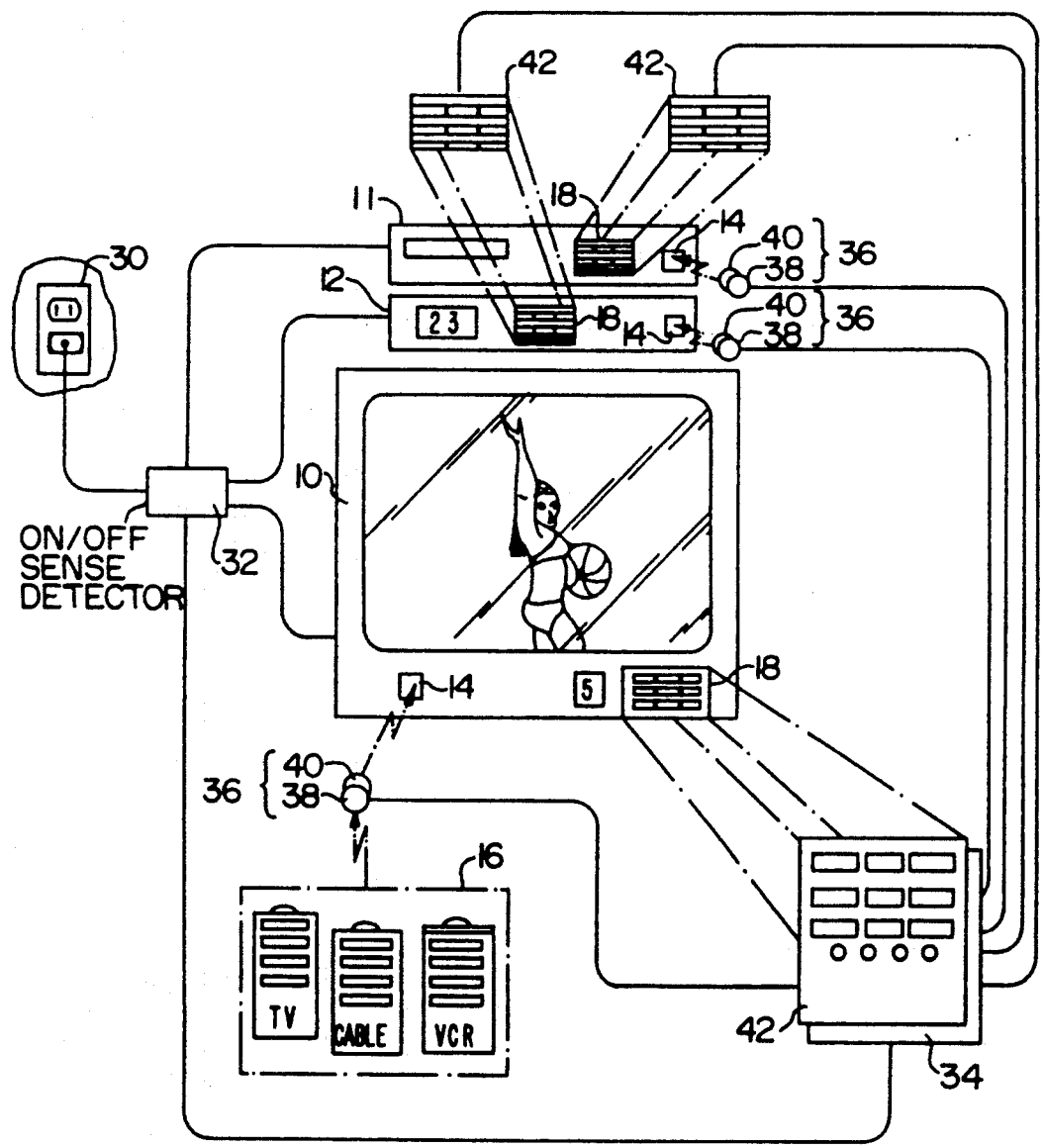
FIG. 1 is a perspective view of the present invention arranged on a home entertainment center that includes a television, cable and a VCR.

FIG. 1 illustrates a typical home entertainment center including a television 10, a VCR 11 and a cable converter 12. Remote control units 16 are provided for controlling television 10, VCR 11 and convertor 12, respectively, by selectively emitting infrared control signals. Television 10, VCR 11 and converter 12 receive the control signals from the remote control units 16 through infrared receptors 14. Digital keypads 18 can also be used to input commands to television 10, VCR 11 and convertor 12.

Monitor 34 is coupled with a wall outlet 30 through an ON/OFF sense detector 32. Television 10, VCR 11 and converter 12 are plugged into ON/OFF sense detector 32 which informs monitor 34 when the home entertainment center is in use. When the user turns on television 10, VCR 11 or converter 12, that information is recorded by monitor 34. Receptors 14 in television 10, VCR 11 and converter 12 are covered by sensors 36, including a receiver 38 and a transmitter 40. When television remote control 16 is used to turn on television 10, the infrared (IR) beam emitted by remote control 16 falls on receiver 38 which transfers the signal to monitor 34. Monitor 34 then regenerates or at least passes the signal to transmitter 40 which emits an IR beam to television 10. Channel selection, using remote control 16, is stored in monitor 34 for future retrieval. Converter 12 has a sensor 36 similar to that associated with television 10. Likewise, VCR 11 has a sensor 36.

Instead of providing a separate receiver 38 and transmitter 40, each sensor 36 may be transparent. In this case, the incoming infrared beam carrying the control signal impinges on sensor 36. Information coded into the beam is transferred directly to the component for which it is intended, and at the same time the information is transferred to monitor 34. In a preferred embodiment, each sensor 36 is not transparent. This insures that the incoming infrared beam is always intercepted for proper detection by monitor 34 and is subsequently passed to television 10 by transmitter 40. Such is also the case with sensor 36 for the converter 12 and VCR 11.

Television 10 may also be controlled through digital keypad 18. The present invention provides a touch panel array 42 which is mounted over keypad 18. Such an array can recognize which key is being pushed and relate this information to monitor 34 for storage and later retrieval. Keypad 18 on VCR 11 and keypad 18 on converter 12 are also provided with touch panel arrays 42 that relay information to monitor 34.

Each touch panel array 42 is fabricated of commercially available touch sensitive materials. Alternatively, it may be formed as a mechanical assembly designed so as to fit over the digital controls 18 of the component. Each time a key or button is depressed, it can be detected by its location within the array. In a preferred embodiment, a mechanical assembly is designed so as to fit over digital controls 18 of the component such that the viewer is denied access to the digital controls. Touch panel array 42 is constructed of commercially available materials such that it becomes a "substitute" keypad having the equivalent ergonomic features of the original component's digital keypad 18. Each time a key on touch panel array 42 is depressed, monitor 34 recognizes the key(s) that are pushed and responds accordingly by reconstructing the equivalent which is subsequently passed to the television 10 by the transmitter 40. The touch panel arrays 42 for VCR 11 and converter 12 work the same way as does touch panel array 42 associated with television 10.

Figure 2:
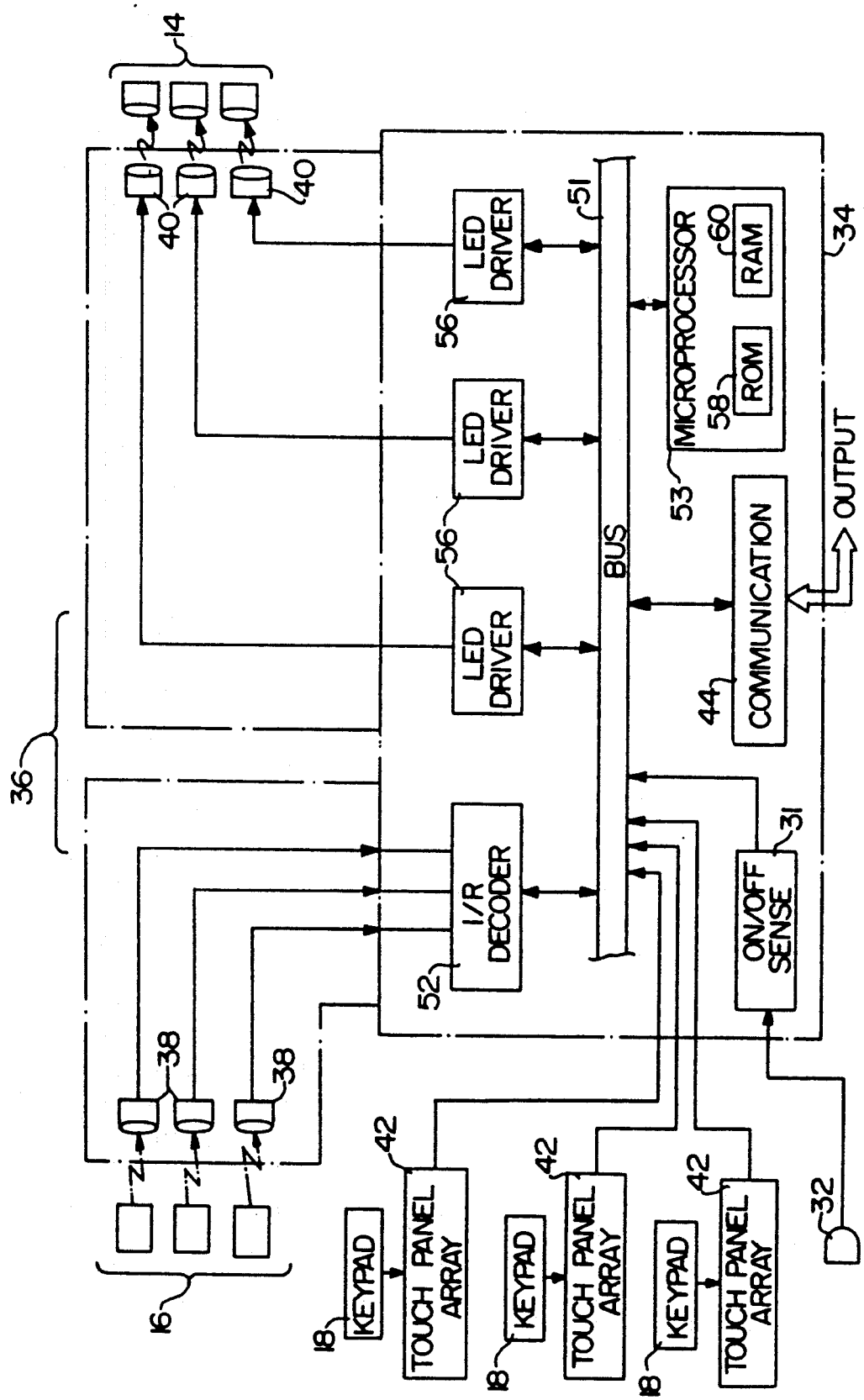
FIG. 2 is a block diagram of the apparatus pictured in FIG. 1, with no television, cable or VCR being depicted.

Monitor 34 will now be described with reference to FIG. 2. Each of the remote control units 16 emits an infrared signal that is received by receiver 38. The IR signal is changed to electrical impulses that IR decoder 52 translates to generate a signal indicating the component of the home entertainment center being operated on and in what manner. For example, when remote control 16 for television 10 is used to change channels, IR decoder 52 transfers this command through bus 51 to microprocessor 53. Microprocessor 53 decodes the IR input and directs a corresponding signal toward transmitter section 40 which is juxtaposed with television IR receptor 14.

Transmitter section 40 is made up of I/R light emitting diodes (LED) that emit I/R signals for receptors 14. Each LED transmitter 40 is driven by a corresponding IR LED driver 56 which receives a command signal from microprocessor 53.

The input signals that are decoded by I/R decoder 52 with the assistance of microprocessor 53 are used to drive the LED drivers 56. In order to effectively route the incoming I/R signal to the intended LED transmitter 40, the microprocessor must go through a "learning routine". As this routine is similar to the learning routine that the "smart" or reconfigurable remote controls discussed above must undergo, the learning process will not be described in detail.

Microprocessor 53 "learns" the various types of signals at the time the invention is installed. "Learning" includes recognizing and discerning the corresponding functions of remote control units 16 associated with the entertainment center and the meaning of each digital control on each of keypads 18 covered by each of the touch panel arrays 42. The purpose of the learning phase is to enable microprocessor 53 to associate all remote control functions with their meaning. In this manner, microprocessor 53 can discriminate those functions that are tuning relevant from functions which are not tuning relevant such as volume control.

Microprocessor 53 includes a read only memory (ROM) 58 in which the system programming is stored. Microprocessor 53 also includes a random access memory (RAM) 60 that stores both information regarding the tuning of the entertainment system for later retrieval and the functions of the different remote control signals.

On/Off sense 31 receives and communicates a signal to the microprocessor 53 via bus 51 whenever a component of the system is turned on or off. On/Off sense 31 passes the information to microprocessor 53 where it is stored in RAM 60.

Figure 3:
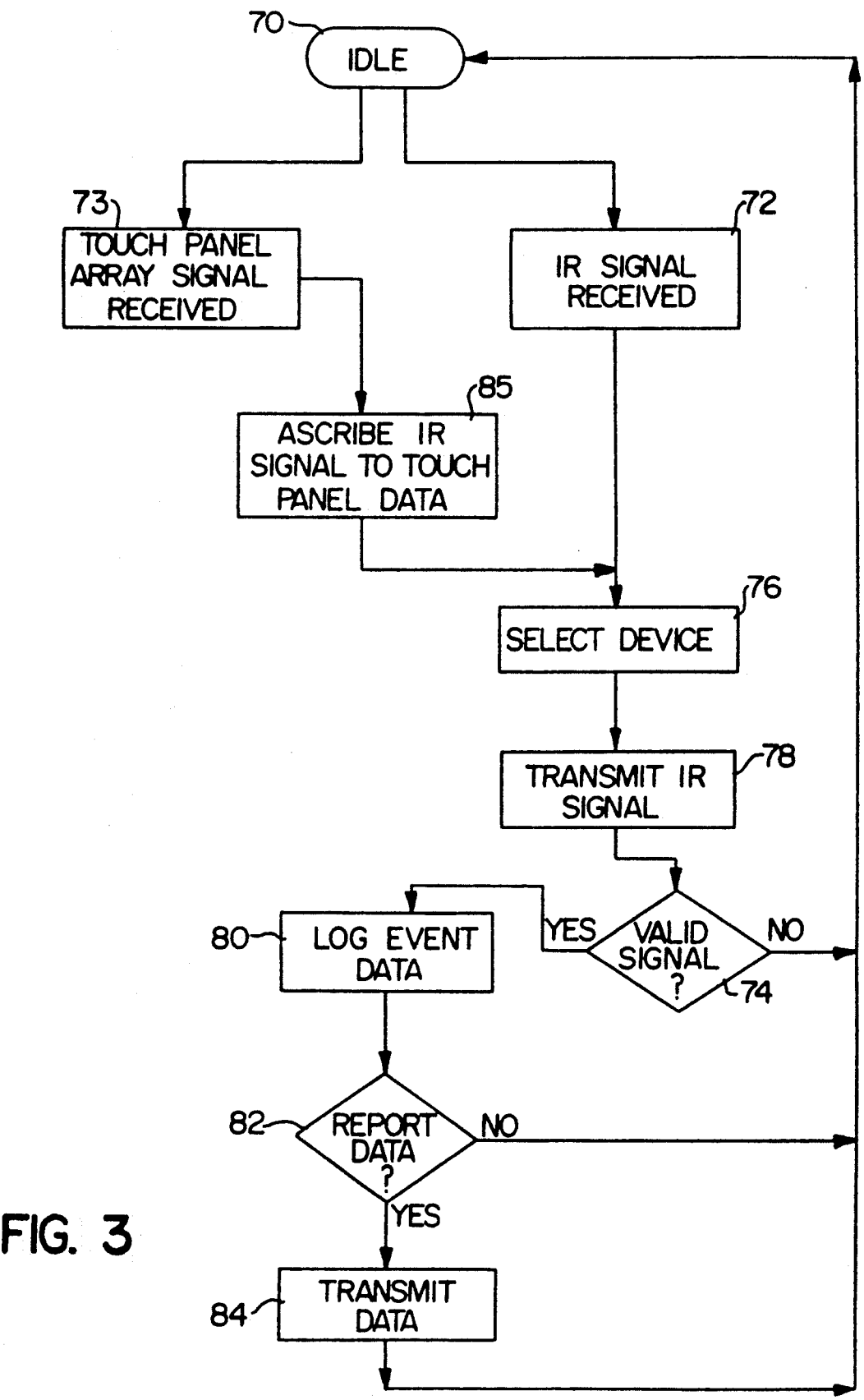
FIG. 3 is a flowchart illustrating the remote control monitoring performed by the apparatus pictured in FIG. 2.

System function will now be explained with reference to FIG. 3. At first, the meter remains idle in step 70. The present invention awaits for a control signal from any of the remote controls 16 of the source device(s) such as the television 10, VCR 11, cable converter 12, etc. or commands from keypads 18, sensed by touch panel arrays 42.

The system proceeds to step 76 in which the device to which the IR signal is being directed to is selected, or the signal can be broadcast to all devices. This is possible because all the pieces that could receive the IR signal are constructed so as to only respond to their own signals. That is, the television only responds to signals from the television remote, the cable to signals from a cable remote, the VCR to signals from a VCR remote, etc. Each device will not respond to signals directed at other remotes, so that it is acceptable to always drive every LED driver 56 and IR LED 54. The only device which will respond to the LED(s) 54 is the device for which the signal was intended. Signals for different devices are coded differently. The infrared signals are a combination of short and long pulses and spaces. The idea is comparable to signalling in morse code with a flashlight.

In step 78, monitor 34 then transmits the IR signal to selected devices by energizing LED driver(s) 56 which in turn cause LED(s) 54 to emit an IR light beam at selected components. It is possible that one driver powers all the LEDs rather than using one driver for each LED as depicted in FIG. 2.

The system proceeds to step 74 in which microprocessor 53 checks if the control signal received from a remote control 16 in step 72 is a valid one so that the event should be logged in step 80. Step 74 determines if the received IR signal is intended for a device that is not being monitored by the present invention. For example, such signals could be generated by children's toys. Alternatively, as volume typically need not be monitored, volume commands need not be logged in step 80, whereas an audio mute signal would be logged in step 80. If the code received in step 72 is invalid or is not to be logged in step 80, the system returns to idle at step 70.

If the control signal is received from touch panel array 42 in step 73, the system in step 76 performs as though the control signal originated in step 72.

Data pertinent to viewing preference is date and time stamped and the information is stored in RAM 60 at step 80, to be later retrieved and reported to a host system. Such information will be utilized to determine programming preferences at a later time. Information such as volume level is not pertinent and therefore is not stored in RAM 60. At certain times, the data is to be transmitted to the host system. This could be at a specified time and date via a modem, Local Area Network (LAN) or when the apparatus is disconnected from the entertainment system. If it is determined that the data is to be transmitted at that time in step 82, the system continues with step 84 in which transmission occurs. Communication device 44 serves as the interface between the meter and the outside world in that device 44 serves as the link to the host collection system. If step 82 determines that data is not to be reported to the host collection system, the invention returns to its initial idle state at step 70, awaiting another IR signal. After data transmission in step 84, the invention also returns to the idle state.

If from the idle state at step 70, a signal to be monitored is received from a touch panel array in step 73, the signal is logged at step 80. In the preferred embodiment, if a signal to be monitored is received from a touch panel array 42 in step 73, the system proceeds to step 85 in which monitor 34 ascribes the appropriate IR signal to that received from touch panel array 42. The system then proceeds to step 76 in which the device for which the signal was intended is selected and then to step 78 where the IR signal is transmitted to the component.

If the data is to be transmitted in step 84, such is transmitted to a central host computer (not shown) that analyzes the data and determines what viewers are watching/listening to.

For example, if the home entertainment center contained a television, a VCR and cable and a movie was being watched on the VCR, the present invention would transmit that the television was on and that the VCR was on, while the host computer would interpret this information to mean that the VCR was supplying the active signal. The state of all components making up the home entertainment system must be considered by the host computer to enable it to determine which component is supplying the signal. If the television receiver is tuned to an empty channel while a cable converter is tuned to channel 23, then cable channel 23 is the selected A/V source. Alternately, if the television is tuned to a non-empty channel, for example channel 5, then channel 5 is the true A/V source. The information transmitted by the present invention to a host computer allows the host computer to determine what device was supplying the signal and to create relevant programming data.

A device and method have been proposed that are able to meter most, if not all, entertainment systems with digital controls and/or digital IR remote control. The method and apparatus are unobtrusive and ergonomic and able to accommodate picture-in-a-picture television, HDTV, and multimedia entertainment centers. Further, the present invention has the advantage of reducing cost by eliminating duplicative equipment. This is achieved by the present invention's ability to monitor the tuning of several devices concurrently where normally each piece of equipment would require its own individual meter.

While the present invention has been described in connection with what is presently considered to be the most practical and preferred embodiment, it is to be understood that the invention is not limited to the disclosed embodiment. On the contrary, the invention is intended to cover various modifications and equivalent arrangements included within the spirit and scope of the appended claims.

What is claimed is:

1. An apparatus for collecting data concerning usage of a programming monitor component of a home entertainment center by monitoring at least one component of said home entertainment center provided with a control signal receiving device responsive to control signal energy produced by a user remote control for exercising remote control of said at least one component, comprising:

means for preventing transmission of the control signal energy from the user remote control to the control signal receiving device;

sensor means for detecting said control signal energy produced by said user remote control to produce remote control responsive signals;

generating means for generating substituted control signal energy corresponding with the control signal energy produced by said user remote control and applying said substituted control signal energy to said control signal receiving device of said at least one component;

means for producing usage data concerning usage of said programming monitor component based on said control signal energy detected by said sensor means; and means for outputting said usage data to enable monitoring of the usage of said programming monitor component.

2. Apparatus as in claim 1, wherein said sensor means includes infrared receiving means for receiving said control signals energy in the form of infrared light energy produced by at least one infrared remote control, said at least one infrared remote control corresponding to at least one component of the home entertainment center.

3. Apparatus as in claim 2, wherein said generating means comprises:

means for determining a respective one of a plurality of components of the home entertainment center which is to receive said control signal energy;

at least one infrared light emitting means for controllably emitting infrared light to a light receiving device of said respective one of said plurality of components provided for receiving said control signal energy; and means for energizing said infrared light emitting means to emit an infrared light signal corresponding with said control signal energy to said light receiving device in response to said determining means.

4. Apparatus as in claim 2, wherein said generating means comprises means for producing infrared light signals corresponding with said infrared light energy produced by said at least one infrared remote control.

5. Apparatus as in claim 4, wherein said means for preventing transmission of the control signal energy comprises blocking means positioned over the control signal receiving device of said at least one component for blocking transmission of said infrared light energy produced by said at least one infrared remote control.

6. Apparatus as in claim 1, wherein said sensor means and said transferring means include a transparent infrared receiver.

7. Apparatus as in claim 1, wherein said outputting means includes a modem.

8. Apparatus as in claim 1, wherein said outputting means includes a local area network.

9. Apparatus as in claim 1, wherein the usage data producing means comprises microprocessor means for producing said usage data based on said control signal energy and memory means for storing said usage data.

10. Apparatus as in claim 9, wherein said microprocessor means includes read only memory means for storing system programming data.

11. Apparatus as in claim 1, further comprising an on/off sensor means for determining when said at least one component of the home entertainment center is on.

12. Apparatus as in claim 11, wherein said on/off sensor means is operative to determine at least one of when a television of said home entertainment center is on and when the television and at least one of a VCR and a cable converter of said home entertainment center are on.

13. Apparatus as in claim 1, wherein said usage data includes information regarding which of a plurality of components of said home entertainment center are in use.

14. An apparatus for collecting data concerning usage of a programming monitor component of a home entertainment center by monitoring at least one component of said home entertainment center provided with a control signal receiving device for receiving control signals produced by a user remote control and a digital keypad for inputting control commands therefor, comprising:

sensor means for detecting said control signals produced by said user remote control;

transferring means for transferring said control signals from the sensor means to said control signal receiving device of said at least one component;

a touch panel array positioned over said digital keypad and operative to provide touch control signals upon user actuation thereof;

said transferring means being operative to produce corresponding control signals in response to said touch control signals and to provide the corresponding control signals to said control signal receiving device;

means for generating usage data concerning usage of said programming monitor component based on said control signals detected by said sensor means; and means for outputting said usage data from said generating means to enable monitoring of the usage of said programming monitor component.

15. Apparatus as in claim 14, wherein said usage data generating means is operative to generate usage data concerning usage of said programming monitor component based on said touch control signals.

16. Apparatus as in claim 14, wherein said sensor means is operative to detect said control signals in the form of infrared light control signals and said transferring means is operative to produce corresponding infrared light control signals in response to each of said infrared light control signals and said touch control signals and to provide the corresponding infrared light control signals to said control signals receiving device.

17. Apparatus for collecting data concerning usage of a programming monitor component of a home entertainment center by monitoring at least one component of said home entertainment center controlled by control signals, comprising:

at least one touch sensitive means positioned over a digital keypad of the at least one component for receiving the control signals;

means for transferring the control signals form the at least one touch sensitive means to the at least one component;

generating means for generating usage data concerning the usage of said programming monitor component, said generating means being coupled with the at least one touch sensitive means to receive the control signals therefrom, said generating means being operative to generate said usage data based on the control signals received thereby from the touch sensitive means; and means for outputting said data from said data generating means to enable monitoring of the usage of said programming monitor component.

18. Apparatus as in claim 17, wherein said transferring means is operative to transfer said control signals to said at least one component in the form of infrared light control signals.

19. An apparatus for collecting data concerning usage of a programming monitor component of a home entertainment center by monitoring at least one component of said home entertainment center controlled by infrared control signal energy received by control signals receiving means thereof, comprising:

at least one infrared remote control unit for generating said infrared control signal energy;

sensor means for detecting said infrared control signals energy from said at least one infrared remote control unit;

means for preventing transmission of said infrared control signal energy from said at least one infrared remote control unit to said control signal receiving means;

generating means for generating infrared light signals corresponding with said infrared control signal energy and supplying said infrared light signals to said control signal receiving means of said at least one component;

means for generating data concerning usage of said programming monitor component based on said infrared control signal energy received by said sensor means; and means for outputting said data from said generating means to enable monitoring of the usage of said programming monitor component.

20. A method of monitoring a home entertainment center having a plurality of components each having a respective user actuatable control responsive to infrared control signal energy received thereby, to provide data concerning usage of at least one programming monitor component of the home entertainment center, comprising the steps of:

detecting infrared control signal energy produced by user actuation of an infrared remote control for actuating a respective user actuatable control of a corresponding one of said plurality of components;

preventing reception of the infrared control signal energy by the respective user actuatable control;

determining the corresponding one of said plurality of components of said home entertainment center for which said infrared control signal energy was produced;

applying a control signal corresponding with the infrared control signal energy to said respective user actuatable control;

generating data concerning usage of the programming monitor component based on the infrared control signal energy; and recording said data concerning usage of the programming monitor component.

21. A method as in claim 20, wherein the step of determining the respective one of said plurality of components further includes ascertaining a function to be performed by the determined component in response to the control signal energy.

22. A method as in claim 1, wherein the step of applying the control signal includes energizing at least one light emitting diode positioned to emit light to a light sensitive control signals receptor of said respective one of said plurality of components.

23. A method as is claim 16, wherein the step of recording said data includes recording said data in a random access memory.

24. A method as in claim 16, further comprising the step of outputting said data with the use of a modem.

25. A method as in claim 16, further comprising the step of outputting said data with the use of a local area network.

26. A method of monitoring a home entertainment center having a plurality of components each having a respective user actuatable control, to provide data concerning usage of at least one programming monitor component of the home entertainment center, comprising the steps of:

detecting a control signal produced by a user for actuating a respective user actuatable control comprising touch sensitive means located over a digital keypad of a respective one of said plurality of components;

determining the respective one of said plurality of components of said home entertainment center for which said control signal was provided;

applying said control signal to said respective user actuatable control;

generating data concerning usage of the programming monitor component based on the control signal; and recording said data concerning usage of the programming monitor component.

27. A method as in claim 20, wherein the step of preventing reception of the control signal energy by the respective user actuatable control comprises preventing reception of the infrared control signal energy by an infrared sensor of said respective user actuatable control.

28. A method as in claim 27, wherein the step of preventing reception of infrared control signal energy comprises positioning infrared light blocking means over an infrared light energy receptor of said infrared sensor.

29. The method as in claim 28, wherein the step of positioning infrared light blocking means over said infrared light energy receptor comprises positioning infrared energy sensitive means over said infrared light energy receptor, and wherein the step of detecting infrared control signal energy comprises detecting said infrared control signal energy with the use of said infrared energy sensitive means.

30. The method as in claim 29, wherein the step of applying a control signal comprises positioning infrared light emitter means between said infrared energy sensitive means and said infrared light energy receptor and energizing said light emitter means to emit infrared light energy to said infrared light energy receptor corresponding with the infrared control signal energy produced by said infrared remote control.

31. An apparatus for collecting data concerning usage of a programming monitor component of a home entertainment center by monitoring at least one component of said home entertainment center provided with a control signal receiving device for receiving control signals produced by a user remote control, comprising:
   sensor means for detecting said control signals produced by said user remote control;
   control signal transmitting means positioned over said control signal receiving device for transmitting said control signals thereto while blocking the reception of control signals from said user remote control by said control signal receiving device;
   means for generating usage data concerning usage of said programming monitor component based on said control signals detected by said sensor means; and
   means for outputting said usage data from said generating means to enable monitoring of the usage of said programming monitor component.

32. A method of monitoring a home entertainment center having at least one component operative to provided at least one of a visual signal and an audible signal to an audience member pursuant to control signals energy provided to a control input of said component in response to an action of an audience member, comprising the steps of:
   intercepting control signal energy directed to said control input of said component by the audience member for exercising a predetermined control of said component such that said control signal energy is prevented from reaching said control input in an amount sufficient to exercise said predetermined control;
   providing second signals corresponding with the intercepted control signal energy to the control input of said component so that the predetermined control thereof is exercised; and
   generating data concerning usage of the component based on the intercepted control signal energy.

33. The method as in claim 32, wherein the step of intercepting control signal energy comprises intercepting light signal energy directed to said control input such that said light signal energy is prevented from reaching said control input in an amount sufficient to exercise said predetermined control.

34. The method as in claim 33, wherein the step of intercepting light signal energy comprises positioning infrared light sensitive means over an infrared light energy receptor of said control input to intercept infrared light signal energy directed thereto, said infrared light sensitive means being operative to prevent transmission of said infrared light signal energy to said infrared light energy receptor.

35. The method as in claim 34, wherein the step of providing second signals comprises positioning infrared light emitter means between said infrared light sensitive means and said infrared light energy receptor and energizing said light emitter means to emit infrared light energy to said infrared light energy receptor corresponding with the infrared light signal energy.

36. The method as in claim 32, wherein the step of intercepting control signal energy comprises intercepting mechanical energy applied by a user to effect control of said component.

37. The method as in claim 36, wherein the step of providing second signals comprises providing an infrared light signal corresponding with said mechanical energy to an infrared remote control receptor of said component.

38. A method for collecting data concerning usage of a programming monitor component of a home entertainment center including at least one component provided with a control signal receiving device for receiving control signals produced by a user remote control, comprising:
   positioning a sensor means over said control signal receiving device for detecting control signals produced by said user remote control, said sensor means permitting transmission of said control signals therethrough to be received by said control signal receiving device;
   detecting said control signals with the use of said sensor means;
   transmitting said control signals through said sensor means to the control signal receiving device of said at least one component; and
   generating usage data concerning usage of said programming monitor component based on the detected control signals.

39. A method of monitoring a home entertainment center having a plurality of components each having a respective user actuatable control responsive to mechanical control signal energy received thereby, to provide data concerning usage of at least one programming monitor component of the home entertainment center, comprising the steps of:
   detecting mechanical energy applied by a user to operate a respective user actuatable control;
   preventing reception of the mechanical energy by the respective user actuatable control;
   determining the respective one of said plurality of components of said home entertainment center for which said mechanical energy was provided;
   applying an infrared light signal corresponding with said mechanical energy to an infrared remote control receptor of said respective one of said plurality of components;
   generating data concerning usage of the programming monitor component based on the mechanical energy; and
   recording said data concerning usage of the programming monitor component.

40. Apparatus for collecting data concerning usage of a programming monitor component of a home entertainment center by monitoring at least one component of said home entertainment center controlled by control signals, comprising:
   touch sensitive means for providing touch control signals upon user actuation thereof;

means for preventing user access to a digital keypad of said at least one component operative to input user commands thereto;

means for providing control signals to said at least one component corresponding with the touch control signals provided by said touch sensitive means upon user actuation thereof;

generating means for generating usage data concerning the usage of said programming monitor component based on the touch control signals provided by the touch sensitive means; and means for outputting said data from said data generating means to enable monitoring of the usage of said programming monitor component.

* * * * *